United States Patent

Hiroi

[11] Patent Number: 5,485,367
[45] Date of Patent: Jan. 16, 1996

[54] PROCESS CONTROL APPARATUS

[75] Inventor: Kazuo Hiroi, Tokyo, Japan

[73] Assignee: Kabushiki Kaisha Toshiba, Kawasaki, Japan

[21] Appl. No.: 385,365

[22] Filed: Feb. 7, 1995

Related U.S. Application Data

[63] Continuation of Ser. No. 132,820, Oct. 7, 1993, abandoned.

[30] Foreign Application Priority Data

Oct. 8, 1992 [JP] Japan .................................. 4-270629

[51] Int. Cl.⁶ .................................................. G05B 13/02
[52] U.S. Cl. ........................ 364/160; 318/561; 364/161; 364/162; 364/177
[58] Field of Search .......................... 364/148, 152–156, 364/157, 158, 159, 160–163, 176, 177, 164, 165, 156, 553; 318/561, 609, 610, 615

[56] References Cited

U.S. PATENT DOCUMENTS

| | | | |
|---|---|---|---|
| 4,006,346 | 2/1977 | Pemberton | 364/165 X |
| 4,419,729 | 12/1983 | Krieder | 364/164 X |
| 4,489,375 | 12/1984 | Putman | 364/177 X |
| 4,755,924 | 7/1988 | Hiroi | 364/162 X |
| 5,043,863 | 8/1991 | Bristol et al. | 364/165 |
| 5,195,028 | 3/1993 | Hiroi | 364/162 X |

*Primary Examiner*—Joseph Ruggiero
*Attorney, Agent, or Firm*—Oblon, Spivak, McClelland, Maier & Neustadt

[57] ABSTRACT

A set point value SV(s) and a process value PV(s) are supplied to a deviation arithmetic operation circuit, and thereby a deviation E(s) is obtained. The deviation E(s) is input to a control arithmetic operation circuit, and at least a PI control arithmetic operation is executed to obtain a manipulative value MV(s) such that the deviation E(s) is set at zero. An disturbance D(s) is added to the manipulative value MV(s) and the result of the addition is supplied to the object to be controlled. A process value filter having a lead/lag time proportional to an integral time $T_I$ of the PI control arithmetic operation is inserted in a feedback line of the process value PV(s) to the deviation arithmetic operation circuit. The transfer function of the filter is $(1+\alpha\cdot\beta\cdot T_I\cdot s)/(1+\beta\cdot T_I\cdot s)$. Although the optimal values of coefficients $\alpha$ and $\beta$ are 2.5 and 0.54, these values are variable in the range of 2 to 4 and the range of 0 to 1, respectively, depending on a first-order delay time T and a dead time L of the object. By setting $\alpha$ and $\beta$ in this way, the gain of the filter can be set at 1 at steady state and more than 1 at the transition state, so that both set point values following characteristic and disturbance suppression characteristics are improved.

10 Claims, 5 Drawing Sheets

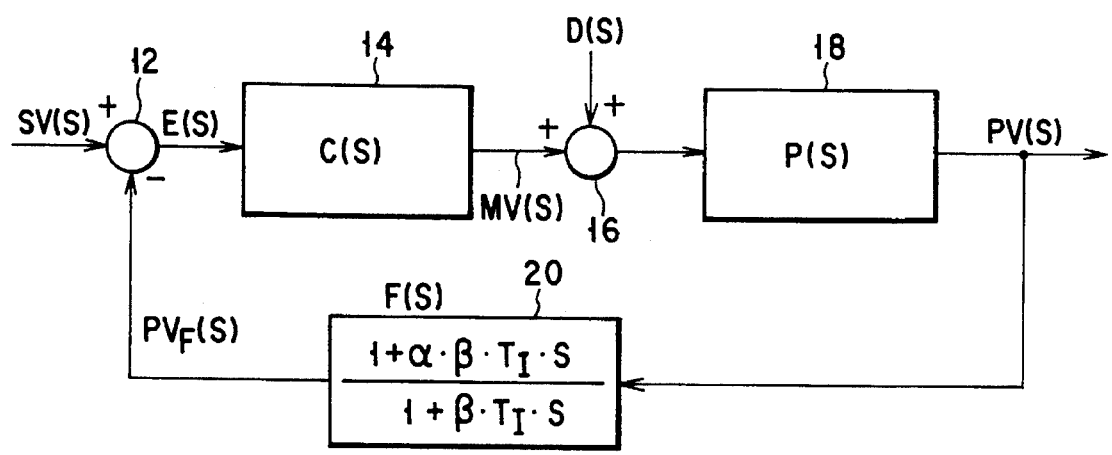
F I G. 3

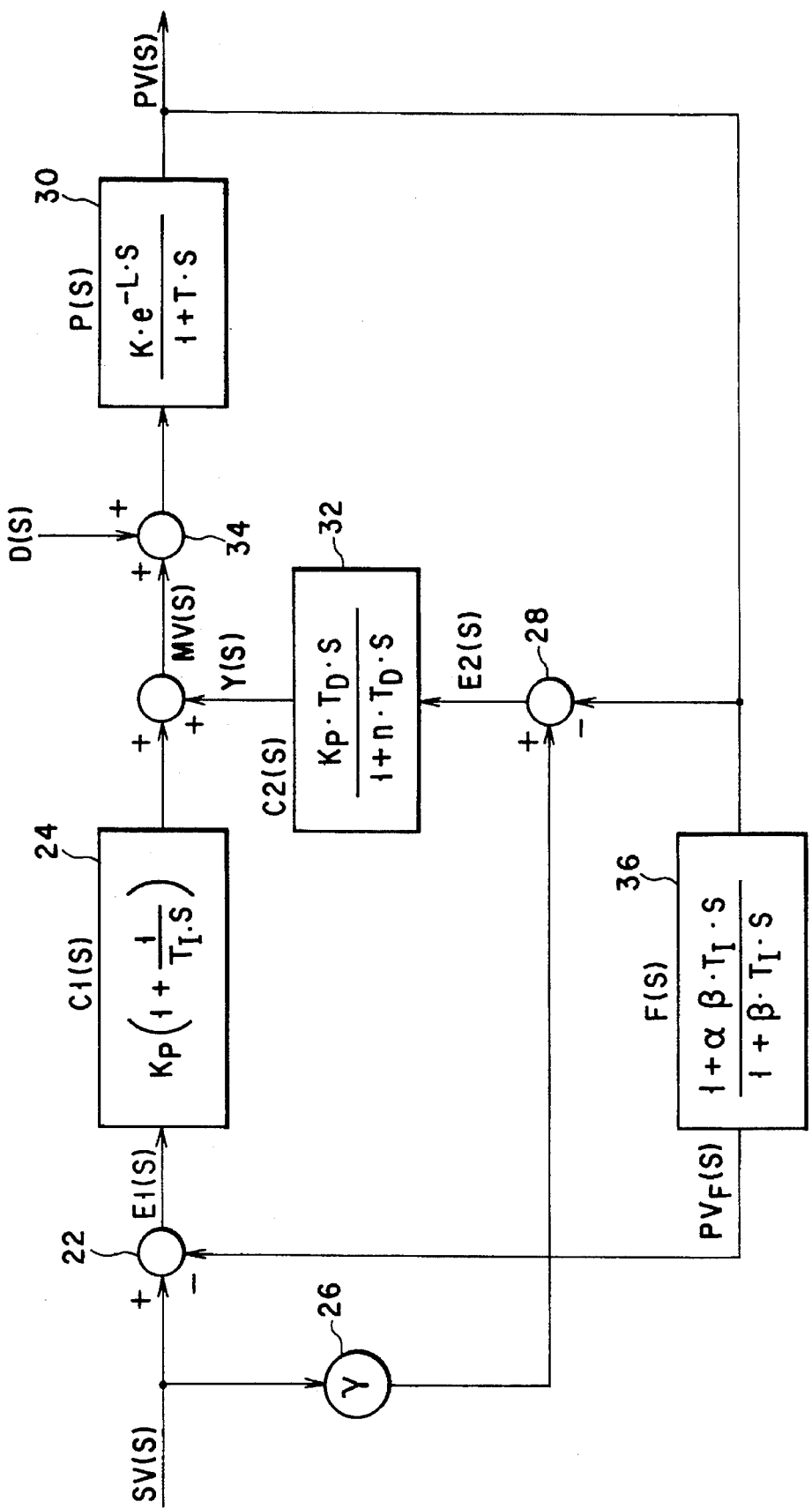
F I G. 4

PROCESS CONTROL APPARATUS

This application is a Continuation of application Ser. No. 08/132,820, filed on Oct. 7, 1993, now abandoned.

BACKGROUND OF THE INVENTION

1. Field of the Invention

The present invention relates to a process control apparatus for a PI or PID (P: proportional, I: integral, D: derivative) control arithmetic operation which is applicable to various control systems as commonly represented by a plant instrumentation and control system, and more particularly to a process control apparatus wherein a filter element depending on integration time of a PI or PID control arithmetic operation is inserted in a feedback line and both disturbance suppression characteristics and set point value following characteristics are simultaneously improved.

2. Description of the Related Art

A PI or PID arithmetic operation has widely been utilized in various industrial fields since the beginning of control technology. Indeed control systems employed in various industrial fields will not work without some type of PI or PID control arithmetic operation.

In a conventional PI or PID control apparatus, a PI or PID control arithmetic operation is performed on the basis of a deviation between a set point value and a process value output from an object to be controlled. Basic equations of the PI and PID control arithmetic operations are given by:

$$MV(s) = C(s) \times E(s) \quad (1)$$
$$= K_P[1 + \{1/(T_I \times s)\}] \times E(s)$$

$$MV(s) = C(s) \times E(s) \quad (2)$$
$$= K_P[1 + \{1/(T_I \times s)\} + \{T_D \times s/(1 + \eta \times T_P \times s)\}] \times E(s)$$

where

MV (s) is a manipulative value supplied to the object to be controlled,

E(s) is a deviation,

C(s) is a transfer function of a regulation portion at which the control arithmetic operation is performed to obtain the manipulative value, $K_P$ : a proportional gain, $T_I$ is an integral time, $T_D$ is a derivative time, s is Laplace's operator, and $1/\eta$ is a derivative gain.

In the conventional process control apparatus, a control loop can be formed by the basic equation (1) or (2), as shown in FIG. 1. A set point value SV(s) is supplied to a deviation arithmetic operation circuit 2, and a deviation E(s) (=SV(s)−PV$_1$(s)) between the set point value SV(s) and a process value PV$_1$(s) from a control object 1 is obtained. The deviation E(s) is supplied to a control arithmetic operation circuit 3 for solving equation (1) or (2). A disturbance D(s) supplied from an external source is added to a manipulative value MV(s) from the control arithmetic operation circuit 3 by an adder 4. The result of this addition is supplied to the control object 1.

The process value PV$_1$(s) of the control apparatus as shown in FIG. 1 is expressed as follows:

$$PV_1(s) = \{C(s) \times P(s)/(1 + C(s) \times P(s))\} \times SV(s) + \{P(s)/(1 + C(s) \times P(s))\} \times D(s) \quad (3)$$

where

C(s) is a transfer function of the control arithmetic operation circuit 3 (see equation (1) or (2)), and P(s) is a transfer function of the control object 1.

Equation (3) is also called a "response equation" of the process value.

Regarding the right side terms of equation (3), the first term relates to the set point following characteristic, and the second term relates to the disturbance suppression characteristic. These terms have proper control constants (proportional gain $K_P$, integral time $T_I$, derivative time $T_D$), However, since the control constants are related commonly to both terms, it is not possible to set optimal values to satisfy both characteristics at the same time. For example, if the control constants are selected to optimize the disturbance suppression characteristic, a great overshoot occurs in the set point following characteristic, and the set point following characteristic become vibrational. Inversely, if the set point value following characteristic are optimized, the disturbance suppression characteristic are degraded, and thus there is an antinomic relationship. This control apparatus is called a "control apparatus of one degree of freedom."

In order to solve this problem, "a control apparatus of two degrees of freedom" has been developed, wherein the set point value following characteristic and disturbance suppression characteristic are controlled independently. FIG. 2 shows a control apparatus wherein a set point value filter 5 of a transfer function H(s) for manipulating the set point value SV(s) is provided in front of the deviation arithmetic operation circuit 2 in the control apparatus of FIG. 1. The other structural points in FIG. 2 are identical to those in FIG. 1. A control value PV$_2$(s) of the control loop shown in FIG. 2 is expressed as follows:

$$PV_2(s) = \{H(s) \times C(s) \times P(s)/(1 + C(s) \times P(s))\} \times SV(s) + \{P(s)/(1 + C(s) \times P(s))\} \times D(s) \quad (4)$$

The difference between equations (4) and (3) is that only the numerator of the first term of equation (4) is multiplied by the transfer function H(s) of the set point value filter 5. Thus, the control constants of the control apparatus are set to optimize the factor due to disturbance in the second term, i.e. the disturbance suppression characteristic. In accordance with the set constant of the set point value filter 5, only the control constants associated with change of the set point value are automatically changed. Thereby, only the set point value following characteristic is improved without affecting the disturbance suppression characteristics of the second term. The transfer function H(s) of the set point value filter 5 needs to be set such that the gain=1 at steady state and<1 at transition state, since the transfer function H(s) compensates the variation of the set point value and transition characteristic.

However, since there is an increasing demand for high-efficiency, flexible plant operations, there is a case where satisfactory disturbance suppression characteristic cannot be obtained by the conventional control system of two degrees of freedom. Considering the present situation in which PID or PI control apparatuses are employed in about 90% of plant control systems, an improvement of characteristics of two-degrees-of-freedom control apparatuses will be conducive to manufacturing of high-quality products.

SUMMARY OF THE INVENTION

Accordingly, it is an object of the present invention to provide a process control apparatus wherein the set point value following characteristic can be made substantially identical to those of a conventional two-degrees-of-freedom PID or PI control apparatus employing a set point value filter, while the disturbance suppression characteristic can be improved, as compared to the conventional two-degrees-of-freedom PID or PI control apparatus.

According to the present invention, there is provided a process control apparatus comprising:

means for obtaining a deviation between a process value and a set point value of an object to be controlled;

arithmetic operation means for obtaining a manipulative value by subjecting the deviation to at least a PI control arithmetic operation;

means for adding the manipulative value and a disturbance and supplying the result of this addition to the object; and filter means connected between the deviation arithmetic operation means and the object, for applying a lead/lag time proportional to an integral time of the PI control arithmetic operation to the process value.

According to the present invention, a filter means having a lead/lag element with a lead/lag time proportional to an integral time of the PI control arithmetic operation is inserted in a feedback line of the process value. Thus, the transfer function of the filter is inserted in the denominators of those terms, which relate to a set point value following characteristic and a disturbance suppression characteristic, of a response equation of a control system representing a process value of the control object by using a transfer function, set point value and disturbance. By setting the gain of the transfer function of the filter at 1 at steady state and more than 1 at the transition state, the set point value following characteristic can be made substantially identical to those of a conventional two-degrees-of-freedom PID or PI control apparatus employing a set point value filter, while the disturbance suppression characteristic can be improved, as compared to the conventional two-degrees-of-freedom PID control apparatus.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 shows schematically the structure of a process value filter type PID control apparatus according to a first embodiment of a process control apparatus of the present invention;

FIG. 4 shows schematically the structure of a process value filter type PID control apparatus according to a second embodiment of the process control apparatus of the present invention;

DETAILED DESCRIPTION OF THE PREFERRED EMBODIMENTS

A preferred embodiment of a process control apparatus according to the present invention will now be described with reference to the accompanying drawings.

Figure 1:
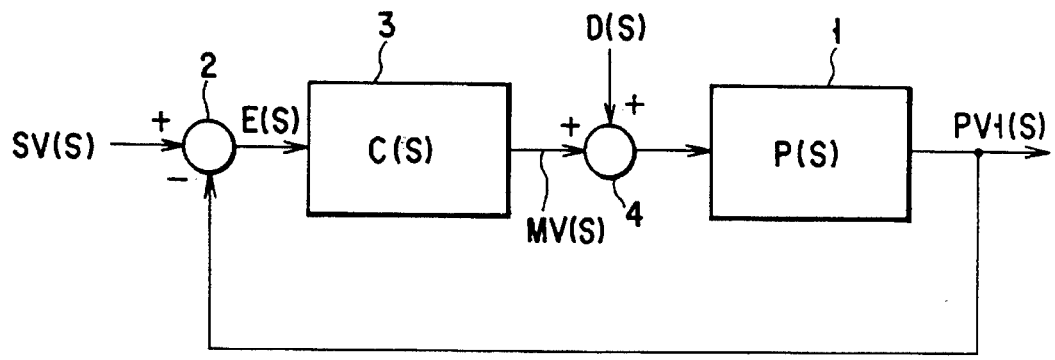
FIG. 1 shows the structure of a conventional one-degree-of-freedom process control apparatus.
Figure 2:
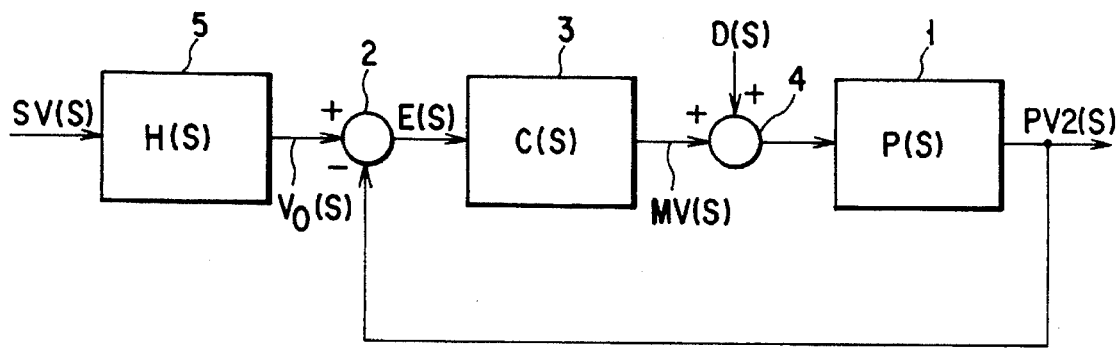
FIG. 2 shows the structure of a conventional two-degrees-of-freedom process control apparatus of a set point value filter type.

FIG. 3 is a block diagram showing the structure of a first embodiment of the present invention. A set point value SV(s) is supplied to a noninverting input terminal (+) of a deviation arithmetic operation circuit 12, and a deviation E(s) between the set point value SV(s) and a process value of a control object 18 is calculated. Symbol "s" is a Laplace's operator. The deviation E(s) is supplied to a control arithmetic operation circuit 14 for performing at least a PI control arithmetic operation. The control arithmetic operation circuit 14 may perform a PID control arithmetic operation. A transfer function C(s) of the control arithmetic operation circuit 14 is the same as that of the prior art shown in FIGS. 1 and 2 (see equations (1) and (2)).

The control arithmetic operation circuit 14 determines a manipulative value MV(s) such that the deviation E(s) becomes zero. A disturbance D(s) is added to the manipulative value MV(s) by an adder 16, and the result of this addition is supplied to a control object 18. A process value PV(s) output from the control object 18 is fed back to an inverting input terminal (−) of the deviation arithmetic operation circuit 12. In the present invention, a process value filter 20 is provided on the process value feedback line between the control object 18 and the deviation arithmetic operation circuit 12. The filter 20 has a lead/lag element of time proportional to integral time $T_I$ in the PI control arithmetic operation of the control arithmetic operation circuit 14. The transfer function F(s) of the filter 20 is expressed by:

$$F(s) = (1+\alpha \cdot \beta \cdot T_I \cdot s)/(1+\beta \cdot T_I \cdot s) \quad (5)$$

where $\alpha$ and $\beta$ are compensation coefficients.

Thus, the deviation arithmetic operation circuit 12 calculates the deviation $E_1(s)$ (=SV(s)−PV$_F$(s)) between the set point value SV(s) and filtered process value PVF(s), Next, the operation of the transfer function F(s) of the process value filter 20 inserted in the process value feedback line will now be described. An equation of a response in this embodiment is given by:

$$PV(s) = \{C(s) \times P(s)/(1 + F(s) \times C(s) \times P(s))\} \times SV(s) + \{P(s)/(1 + F(s) \times C(s) \times P(s))\} \times D(s) \quad (6)$$

F(s) is inserted into the denominators of the first term (relating to the set point value following characteristic) and the second term (relating to the disturbance suppression characteristic) of the right side. The lead/lag element F(s) is synthesized with the transfer function C(s) of the control arithmetic operation circuit 14. The synthesized transfer function F(s)·C(s) will now be discussed. When the control arithmetic operation circuit 14 performs PI control operations (i.e. $C(s)=K_P\{1+1/(T_I \cdot s)\}$), the synthesized transfer function is expressed as follows:

$$F(s) \times C(s) = \left(\frac{1 + \alpha \times \beta \times T_I \times s}{1 + \beta \times T_I \times s}\right) \times K_P\left(1 + \frac{1}{T_I \times s}\right) \quad (7)$$

$$= K_P\left[\alpha + \left\{\frac{1}{T_I \times s} - \frac{(\alpha - 1) \times (1 - \beta)}{1 + \beta \times T_I \times s}\right\}\right]$$

From equation (7), it is understood that the proportional operation is effected $\alpha$ times. When $\alpha=1$, $F(s)\cdot C(s)=C(s)$. In this case, it is supposed that the process value filter 20 is not present. If the equation (7) is substituted in equation (6), then equation (6) is modified as follows:

$$PV(s) = \quad (8)$$

$$\frac{K_P\left(1 + \frac{1}{T_I \times s}\right) \times P(s)}{1 + K_P\left\{\alpha + \frac{1}{T_I \times s} - \frac{(\alpha-1) \times (1-\beta)}{1 + \beta \times T_I \times s}\right\} \times P(s)} \times SV(s) +$$

$$\frac{P(s)}{1 + K_P\left\{\alpha + \frac{1}{T_I \times s} - \frac{(\alpha-1) \times (1-\beta)}{1 + \beta \times T_I \times s}\right\} \times p(s)} \times D(s)$$

From equation (8), the following are clear.

When $\alpha=1$ and $\beta=1$, the operations of the present invention are identical to those of the conventional one-degree-of-freedom PID control apparatus.

As the value of a is increased gradually from 1, the denominators of the first and second terms of the response equation (8) increase, and the set point value following characteristic can be made identical to those of the conventional two-degrees-of-freedom PID control apparatus. In addition, the disturbance suppression characteristics decrease as a whole, and the response characteristics are improved, as compared to the conventional one-degree-of-freedom PID control apparatus.

By varying not only $\alpha$ but also $\beta$, the response characteristic can be further improved.

A second embodiment of the present invention will now be described in detail with reference to simulation results. FIG. 4 shows a block diagram in which a process value filter is inserted in a so-called PI-D control apparatus, i.e. a differential preceding type PID control apparatus, as a second embodiment of the present invention.

A set point value SV(s) is supplied to a noninverting input terminal of a deviation arithmetic operation circuit 22, and a deviation El(s) between the value SV(s) and a process value of a control object 30 is calculated. Symbol "s" represents a Laplace's operator. The deviation El(s) is supplied to a first control arithmetic operation circuit 24 for performing a PI control operation. The transfer function Cl(s) of the control operation circuit 24 is expressed by:

$$C_1(s) = K_P\{1+1/(T_I s)\} \quad (9)$$

where $K_P$ is a proportional gain, and
$T_I$ is an integral time.

In this embodiment, a process value PV(s) is input to a lead/lag element functioning as a compensation element, and its output PVF(s) is used in deviation calculation operations. Thereby, the PI control operations are provided with two degrees of freedom. In this case, however, if a derivative control arithmetic operation circuit is inserted in a process value feedback system, the structure of the apparatus is complicated. Therefore, the coefficient $\gamma$ is inserted into the set point value SV(s). A transfer function $Z_1(s)$ between the set point value SV(s) and an output Y(s) of a second control arithmetic operation circuit 32 $Z_1(s)$ is represented as follows:

$$Z_1(s) = Y(s)/SV(s)$$
$$= \gamma \times T_D \times s/(1 + \eta \times T_D \times s)$$

A transfer function $Z_2(s)$ between the set process value PV(s) and the output Y(s) of the second control arithmetic operation circuit 32 is represented as follows:

$$Z_2(s) = Y(s)/PV(s)$$
$$= T_D \times s/(1 + \eta \times T_D \times s)$$

Based on the above two equations, a following equation is obtained.

$$Z_1(s)=\gamma \cdot Z_2(s)$$

$$\therefore Z_1(s)/Z_2(s)=\gamma$$

As a result, the derivative operation with respect to the set point value SV(s) is $\gamma$ times as large as the derivative operation with respect to the process value PV(s). By changing the coefficient $\gamma$, the D control operation can be provided with two degrees of freedom.

The set point value SV(s) is also input to a noninverting input terminal of a subtracter 28 via a multiplier ($\times\gamma$) 26. An inverting input terminal of the subtracter 28 receives the process value PV(s) of the control object 30. An output $E_2(s)$ from the subtracter 28 is supplied to a second control arithmetic operation circuit 32 for performing a D control operation. The transfer function $C_2(s)$ of the control arithmetic operation circuit 32 is expressed by:

$$C_2(s) = K_P \cdot K_D \cdot s/(1+\eta \cdot T_D \cdot s) \quad (10)$$

where $T_D$ is a derivative time, and
$1\eta$ is a derivative gain.

The first and second control arithmetic operation circuits 24 and 32 calculate a manipulative value MV(s) which will set the deviation El(s) at zero. Specifically, the manipulative value MV(s) is obtained on the basis of a derivative preceding type PID control arithmetic operation. The basic equation of the PID control arithmetic operation is expressed by:

$$MV(s) = E_1(s) \times C_1(s) + E_2(s) \times C_2(s) \quad (11)$$
$$= K_P\{1 + 1/(T_I \times s)\} \times E_1(s) +$$
$$K_P\{T_P \times s/(1 + \eta \times T_D \times s)\} \times E_2(s)$$

The disturbance D(s) is added to the manipulative value MV(s) by an adder 34, and the result of this addition is supplied to the control object 30. The process value PV(s) output from the control object 30 is fed back to the inverting input terminal of the deviation arithmetic operation circuit 22. In the present invention, a process value filter 36 having a lead/lag element of a time proportional to integral time $T_I$ of the first control arithmetic operation circuit 24 is provided on the process value feedback line between the control object 30 and the deviation arithmetic operation circuit 22. The transfer function F(s) of the filter 36 is the same as is indicated by equation (5) in the first embodiment.

Thus, the deviation arithmetic operation circuit 22 calculates the deviation $E_1(s)$ $(=SV(s)-PV_F(s))$ between the set point value SV(s) and the filtered process value $PV_F(s)$.

The operation of the second embodiment will now be described. The response equation of the control system of the process control apparatus shown in FIG. 4 is expressed by:

$$PV(s) = \frac{\{C_1(s) + \gamma \times C_2(s)\} \times P(s)}{1 + \{F(s) \times C_1(s) + C_2(s)\} \times P(s)} \times SV(s) + \frac{P(s)}{1 + \{F(s) \times C_1(s) + C_2(s)\} \times P(s)} \times D(s) \quad (12)$$

Regarding equation (12), the first term of the right side relates to set point value following characteristic, and the second term relates to disturbance suppression characteristic. As is clear from equation (12), the filter F(s) having the lead/lag element is inserted into the denominators of the first and second terms and is synthesized with transfer functions $C_1(s)$ and $C_2(s)$ of the control arithmetic operation circuits 24 and 36. Thus, by setting the gain of the filter 36 at 1 at steady state and setting the gain at more than 1 at transition state, the set point value following characteristic becomes identical to that of the conventional set point value filter type two-degrees-of-freedom PID control apparatus. In addition, the disturbance suppression characteristic can be improved, as compared to the conventional two-degrees-of-freedom PID control apparatus. It is understood, from equation (12), that when $\gamma=0$, a PI operation is performed.

Figure 5:
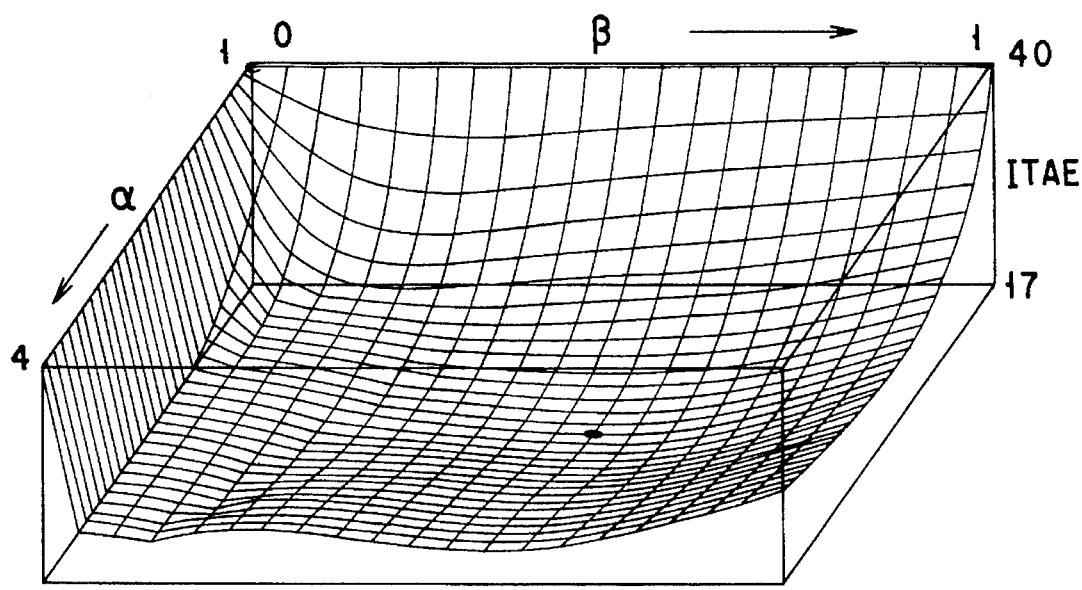
FIG. 5 illustrates three-dimensionally a simulation result of controllability estimation function (ITAE), when compensation coefficients $\alpha$ and $\beta$ of the process control apparatus have been varied.
Figure 6:
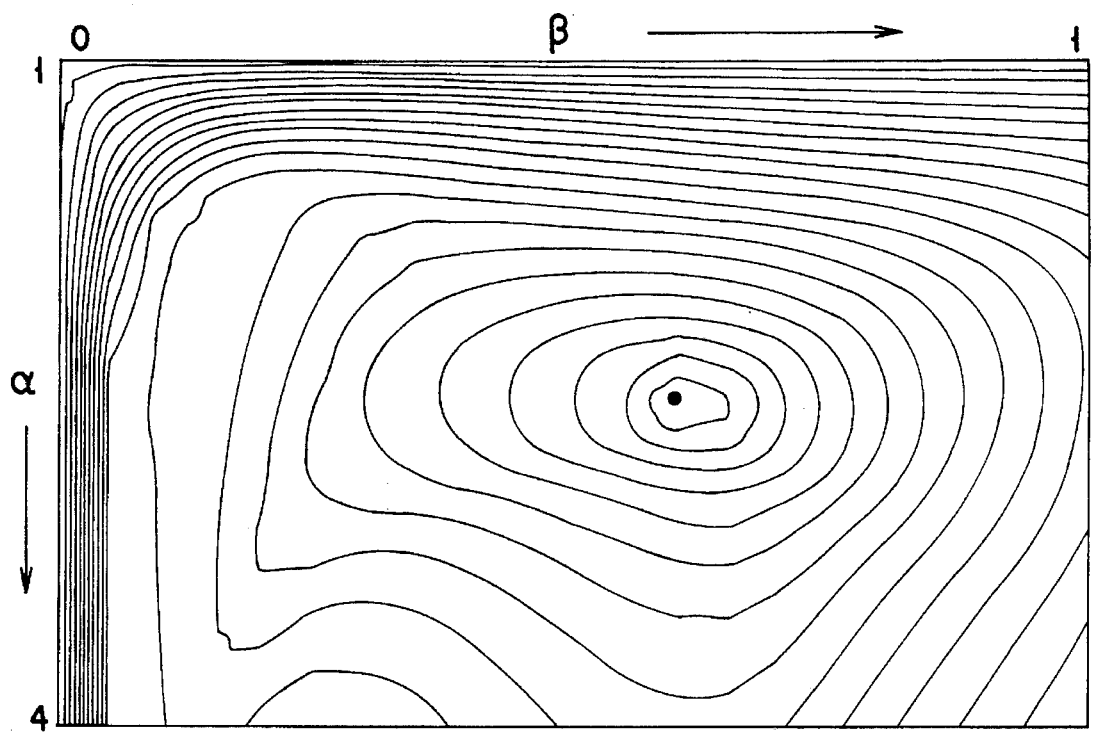
FIG. 6 illustrates, by using contour lines, a simulation result of controllability estimation function (ITAE), when compensation coefficients $\alpha$ and $\beta$ of the process control apparatus have been varied.

If equations (9), (10) and (5) are substituted in equation (12), the following equation is obtained:

multiplied Absolute-value of Error). FIG. 5 shows three-dimensionally the variation of the ITAE when $\alpha$ and $\beta$ were varied. FIG. 6 shows, by using contour lines, the variation of the ITAE when $\alpha$ and $\beta$ were varied. From these figures, it is understood that the optical values are $\alpha=2.5$ and $\beta=0.54$. Table 1 shows the ITAE of the response when $\alpha=2.5$ and $\beta=0.54$.

TABLE 1

| System | ITAE | |
|---|---|---|
| | Set Point value | Disturbance |
| One-degree-of-freedom PID control system | 68.5 | 37.5 |
| Two-degrees-of-freedom PID control system (Set point filter type) | 45.0 | 37.5 |
| Two-degrees-of-freedom PID control system of Present Invention (Feedback filter type) $\alpha = 2.5$ and $\beta = 0.54$ | 33.3 | 35.5 |

In a PID control, a measured value differential preceding type PID control apparatus in which the process value is only differentiated and the set point value is not differentiated is widely used. In this case, the coefficient $\gamma$ is set to 1. If the coefficient $\gamma$ is used in order to improve the set point value following characteristic, it is set to a value between 0 and 1.5 while monitoring the response of the control object.

Figure 7:
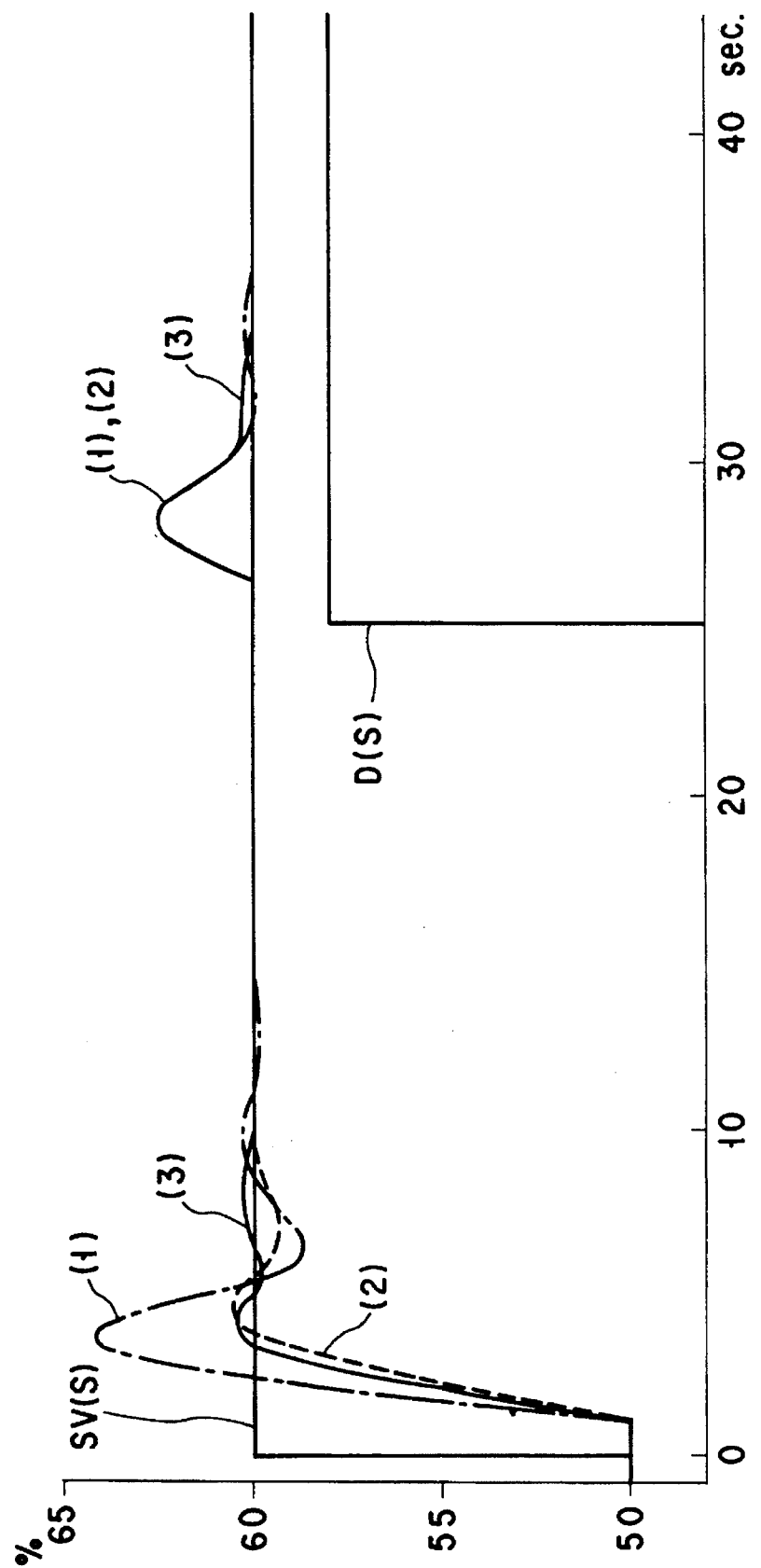
FIG. 7 shows a response in the first and second embodiments of the present invention.

FIG. 7 shows comparative data of responses in the above three systems. The dot-and-dash line (1) represents the response in the one-degree-of-freedom PID control system, the broken line (2) represents the response in the two-degrees-of-freedom PID control system of a set point value filter type, and the solid line (3) represents the response in the two-degrees-of-freedom PID control system of a process value filter type according to the present invention.

From the comparison data, it is understood that by controlling the coefficients a and D, the disturbance response can be kept at an optimal state and the set point value $$PV(s) = \frac{K_P\left(1 + \frac{1}{T_I \times s} + \frac{\gamma \times T_D \times s}{1 + \eta \times T_D \times s}\right) \times P(s)}{1 + K_P\left[\alpha + \left\{\frac{1}{T_I \times s} - \frac{(\alpha-1) \times (1-\beta)}{1 + \beta \times T_I \times s}\right\} + \frac{T_D \times s}{1 + \eta \times T_D \times s}\right] \times P(s)} \times SV(s) + \frac{P(s)}{1 + K_P\left[\alpha + \left\{\frac{1}{T_I \times s} - \frac{(\alpha-1) \times (1-\beta)}{1 + \beta \times T_I \times s}\right\} + \frac{T_D \times s}{1 + \eta \times T_D \times s}\right] \times P(s)} \times D(s) \quad (13)$$

If $\alpha=1$, $\beta=1$ and $\gamma=1$, equation (13) becomes equal to equation (3), and the present apparatus becomes the same as the conventional one-degree-of-freedom PI control apparatus.

Figure 8:
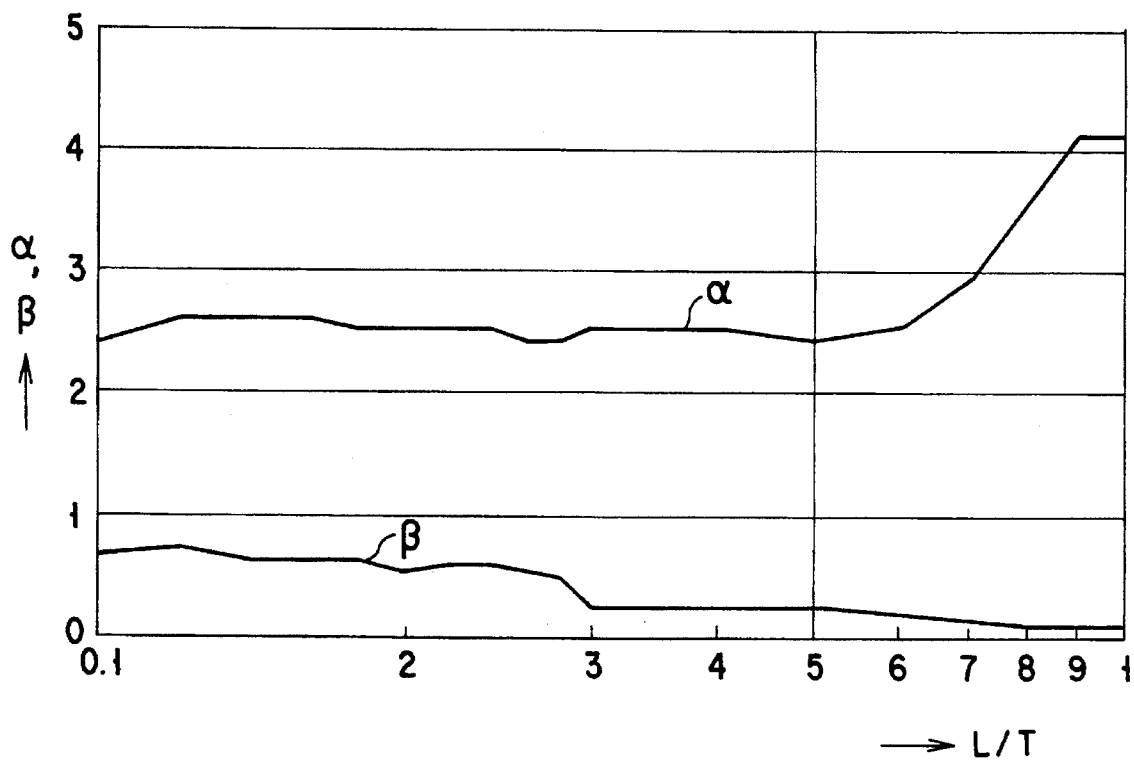
FIG. 8 shows variations of compensation coefficients $\alpha$ and $\beta$ in relation to a variation of characteristics of a control object.

FIGS. 5, 6, 7 and 8 and Table 1 show simulation results based on equation (13). The simulation was carried out in the PI operation with $T_D=0$. The control object 30 is represented by a 1st-order delay time and a dead time. Specifically, the transfer function P(s) of the control object 50 is $\{K/(1+T \cdot s)\} \cdot \exp(-L \cdot s)$ (where K=the gain, L=the dead time (1 sec.) and T=the time constant (5 sec.). By varying compensation coefficients $\alpha$ and $\beta$ of the process value filter 36, a combination of the proportional gain $K_P$ and integral time $T_I$ for optimizing the set point value following characteristic and disturbance suppression characteristic was obtained. The optical value was evaluated by ITAE (Integral of Time-following characteristic can be improved. The PID control constants are varied, depending on the coefficients $\alpha$ and $\beta$. FIG. 8 shows the control object dependency of the coefficients $\alpha$ and $\beta$. Specifically, it is understood that even if the L/T varies (L/T is usually not more than 0.8), it suffices to set the coefficient a in the range of 1 to 4 with a slight allowance, and to set the coefficient D in the range of 0 to 1.5.

From the above simulation, the following may be understood:

When $\alpha=1$ and $\beta=1$, the present apparatus is identical to the conventional one-degree-of-freedom PID control apparatus.

When $\alpha$ is an optional value and $\beta=1$, only the P operation is provided with two degrees of freedom.

When α=2.5, or a is nearly equal to 2.5, and β=1, the optimal control system of the P operation with two degrees of freedom can be realized.

When α=2.5, or α is nearly equal to 2.5, and β=0.54, the optimal control system of the PI operation with two degrees of freedom can be realized.

As is clear from equation (13), the proportional gain is represented by $\alpha K_P$ and thus the coefficient $\alpha$ only relates to the proportional gain. The coefficient β can vary the integral term so that the I control operation can be provided with two degrees of freedom by varying the coefficient β.

In brief, the response of the conventional one-degree-of-freedom PID control apparatus is represented by equation (3). If the control constants are set with regard to the disturbance suppression characteristic, an overshoot of the process value occurs in relation to the variation of the set point value.

The response equation (4) is obtained with the conventional two-degrees-of-freedom PID control apparatus which employs the set point value filter to improve the set point value following characteristic. The set point value following characteristic can be improved by multiplying the response of the component due to the set point value of the first term of equation (4) by the set point value filter with which the gain is 1 at steady state and less than 1 at transition state.

Furthermore, according to the present invention, as shown in equation (12) or (13), the process value filter 36, which has the lead/lag element F(s) corresponding to the integral time $T_I$ and the gain set to 1 at steady state and more than 1 at transition state, is inserted in the denominator of the response equation of the control system, so that the denominator is increased. Thereby, the overshoot of the component due to the set point value of the first term of the response equation can be suppressed, and the variation of the component due to the disturbance of the second term can be further reduced. The set point value following characteristic of the present apparatus can be made identical to the two-degrees-of-freedom PID control apparatus of the set point value filter type, and the disturbance suppression characteristic can be further improved, as compared to the two-degrees-of-freedom PID control apparatus of the set point value filter type. Table 2 shows comparison data of the three systems.

TABLE 2

| System | Set point following characteristic | Disturbance suppression characteristic |
|---|---|---|
| One-degree-of-freedom PID control system | "Bad" | "Good" |
| Two-degrees-of-freedom PID control system (Set point filter type) | "Good" | "Bad" |
| Two-degrees-of-freedom PID control system of Present Invention (feedback filter type) α = 2.5 and β = 0.54 | "Good" | "Excellent" |

As has been described above, the lead/lag element having a lead/lag time proportional to the integral time is inserted in the process value feedback line. Thus, the process control apparatus can be obtained, wherein the set point value following characteristic can be made substantially identical to the conventional two-degrees-of-freedom PID control apparatus of the set point value filter type, while the disturbance suppression characteristic can be improved, as compared to the conventional two-degrees-of-freedom PID control apparatus. Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the embodiments, the PID control apparatus is employed. However, the present invention can be applied to a PI control apparatus in which D control arithmetic operation is omitted. The optimal values of the compensation coefficients depend on the characteristics of the control object, and if the characteristics vary, the optimal values vary accordingly.

What is claimed is:

1. A process control apparatus for controlling operation of an object, comprising:

subtractor means for obtaining a deviation between a signal derived from a process value of the object and a set point value;

control arithmetic operation means for calculating a manipulative value by subjecting the deviation to at least a proportional-integral control arithmetic operation;

means for controlling the object in response to a control signal developed by adding the manipulative value and a disturbance and supplying a sum of the manipulative value and the disturbance to the object to control the object; and filter means, connected between the subtractor means and the process value of the object, for applying a lead/lag time proportional to an integral time of the proportional-integral control arithmetic operation to the process value to produce said signal derived from said process value and supply said signal to said subtractor means in order to improve a set point value following characteristic and a disturbance suppression characteristic, wherein said filter means has a transfer function represented by $(1+\alpha \cdot T_I s)/(1+T_I s)$ where $T_I$ is an integral, s is a Laplace operator, and α is a coefficient in the range of 1 to 4.

2. The apparatus according to claim 1, in which a transfer function P(s) of the object is expressed by $P(s)=\{K/(1+T \cdot s)\} \cdot \exp(-L \cdot s)$ where L : a dead time, T : a time constant, and K : a gain, and an optimal value of α is 2.5 when L/T is 0.25.

3. The apparatus according to claim 1, in which a gain of said filter means is 1 at steady state, and is more than 1 at transition state.

4. The apparatus according to claim 1, in which said control arithmetic operation means calculates the manipulative value by subjecting the deviation to a PID control arithmetic operation.

5. The apparatus according to claim 4, in which said control arithmetic operation means comprises:

first control arithmetic operation means for subjecting a deviation EI(s) between a set point value SV(s) and a process value PVF(s) output from said filter means to a PI control arithmetic operation, a transfer function CI(s) of said first control arithmetic operation means being expressed by $$C_1(s) = K_P\{1 + 1/(T_I \cdot s)\}$$

where $K_P$ : a proportional gain, and $T_I$ : an integral time; and second control arithmetic operation means for subjecting a deviation $E_2(s)$ between γ-times the set point value $SV(s)$ and the process value $PV(s)$ output from the object to a derivative control arithmetic operation, a transfer function $C_2(s)$ of said second control arithmetic operation means being expressed by $$C_2(s) = K_P \cdot T_D \cdot s/(1 + \eta \cdot T_D \cdot s)$$

where $T_D$ : a derivative time, and $1/\eta$ : a derivative gain.

6. A process control apparatus for controlling operation of an object, comprising:

subtractor means for obtaining a deviation between a signal derived from a process value of the object and a set point value;

control arithmetic operation means for calculating a manipulative value by subjecting the deviation to at least a proportional-integral control arithmetic operation;

means for controlling the object in response to a control signal developed by adding the manipulative value and a disturbance and supplying a sum of the manipulative value and the disturbance to the object to control the object; and filter means, connected between the subtractor means and the process value of the object, for producing said signal derived from said process value by applying a lead/lag time proportional to an integral time of the proportional-integral control arithmetic operation to the process value and supplying said signal to said subtractor means in order to improve a set point value following characteristic and a disturbance suppression characteristic, wherein said filter means has a transfer function represented by $$(1 + \alpha \cdot \beta \cdot T_I \cdot s)/(1 + \beta \cdot T_I \cdot s)$$

where $T_I$ is an integral time, s is a Laplace operator, α is a coefficient of 1 to 4, and β is a coefficient of 0 to 1.5.

7. The apparatus according to claim 6, in which a transfer function $P(s)$ of the object is expressed by $$P(s) = \{K/(1 + T \cdot s)\} \cdot \exp(-L \cdot s)$$

where L : a dead time,

T : a time constant, and

K : a gain, and an optimal value of α is 2.5 when L/T is 0.25.

8. The apparatus according to claim 6, wherein a gain of said filter means is 1 at a steady state, and is greater than 1 at a transition state.

9. The apparatus according to claim 6, wherein said control arithmetic operation means calculates the manipulative value by subjecting the deviation to a PID control arithmetic operation.

10. The apparatus according to claim 9, wherein said control arithmetic operation means comprises:

first control arithmetic operation means for subjecting a deviation $E1(s)$ between a set point value $SV(s)$ and a process value $PV_F(s)$ output from said filter means to a PI control arithmetic operation, a transfer function $C_1(s)$ of said first control arithmetic operation means being expressed by $$C_1(s) = K_P\{1 + 1/T_I \cdot s)\}$$

where $K_P$ is a proportional gain and $T_I$ is an integral time; and said control arithmetic operation means for subjecting a deviation $E_2(s)$ between γ-times the set point value $SV(s)$ and the process value $PV(s)$ output from the object to a derivative control arithmetic operation, a transfer function $C_2(s)$ of said second control arithmetic operation means being expressed by $$C_2(s) = K_P \cdot T_D \cdot s/(1 + \eta \cdot T_D \cdot s)$$

where $T_D$ is a derivative time, and $1/\eta$ is a derivative gain.

* * * * *